(12) United States Patent
Rodríguez Fernández et al.

(10) Patent No.: US 7,898,742 B2
(45) Date of Patent: Mar. 1, 2011

(54) VARIABLE FOCUS MICROLENS

(76) Inventors: Isabel Rodríguez Fernández, Singapore (SG); Peter M. Moran, Singapore (SG); Aik Hau Khaw, Singapore (SG); Saman Dharmatilleke, Singapore (SG)

( * ) Notice: Subject to any disclaimer, the term of this patent is extended or adjusted under 35 U.S.C. 154(b) by 677 days.

(21) Appl. No.: 11/572,317

(22) PCT Filed: Jul. 20, 2004

(86) PCT No.: PCT/SG2004/000217
§ 371 (c)(1),
(2), (4) Date: Jan. 19, 2007

(87) PCT Pub. No.: WO2006/009514
PCT Pub. Date: Jan. 26, 2006

(65) Prior Publication Data
US 2008/0019015 A1  Jan. 24, 2008

(51) Int. Cl.
*G02B 1/06* (2006.01)
(52) U.S. Cl. .................................. 359/666; 359/665
(58) Field of Classification Search .......... 359/665–667, 359/253
See application file for complete search history.

(56) References Cited

U.S. PATENT DOCUMENTS

| | | | |
|---|---|---|---|
| 5,574,598 A | 11/1996 | Koumura et al. | |
| 6,014,259 A | 1/2000 | Wohlstadter | |
| 6,369,954 B1 | 4/2002 | Berge et al. | |
| 6,545,815 B2 | 4/2003 | Kroupenkine et al. | |
| 7,088,917 B2 * | 8/2006 | Butterworth | 396/89 |
| 7,180,688 B2 | 2/2007 | Kikuchi | |
| 2004/0174610 A1 | 9/2004 | Aizenberg et al. | |
| 2007/0201138 A1 * | 8/2007 | Lo | 359/666 |
| 2009/0086331 A1 * | 4/2009 | Gunasekaran et al. | 359/666 |

FOREIGN PATENT DOCUMENTS

| | | |
|---|---|---|
| CN | 1527082 | 9/2004 |
| DE | 19605984 C1 | 9/1997 |
| DE | 29823857 U1 | 2/2000 |
| JP | 07049404 | 2/1995 |
| SU | 783742 T | 11/1980 |
| WO | 03102636 A1 | 12/2003 |
| WO | 2004051323 A1 | 6/2004 |

OTHER PUBLICATIONS

Jackie Chen, Weisong Wang, Ji Fang and Kody Varahramyan, Variable-focusing Microlens with Microfluidic Chip, Journal of Micromechanics and Microengineering, Mar. 17, 2004, Institute of Physics Publishing (Printed in the UK), pp. 675-680.
T. Krupenkin, S.Yang and P.Mach, Tunable Liquid Microlens, Applied Physics Letters, vol. 82 No. 3, Jan. 20, 2003, American Institute of Physics, pp. 316-318.

* cited by examiner

*Primary Examiner* — Jordan M. Schwartz
(74) *Attorney, Agent, or Firm* — Horizon IP Pte Ltd

(57) ABSTRACT

A microlens chip comprises a variable focus fluidic microlens and actuator. The actuator varies the pressure in a fluidic channel in the microlens chip which is coupled to an aperture opening containing the microlens. Applying an electric field to the actuator creates changes in fluid pressure in the fluidic channel, which in turn changes the radius of curvature (i.e., focal length) of the fluidic microlens.

21 Claims, 15 Drawing Sheets

VARIABLE FOCUS MICROLENS

FIELD OF THE INVENTION

This invention relates to microlenses in general. More particularly, the invention relates to variable focus liquid microlenses.

BACKGROUND OF THE INVENTION

FIG. 1 shows a conventional fluidic microlens 101. As shown, the microlens comprises a substrate 110. The substrate includes a ground electrode 121 between first and second control electrodes 123a-b. The ground electrode is coupled to ground reference voltage while the control electrodes are coupled to variable voltage sources. Dielectric and coating layers 130 and 135 are disposed over the electrodes. The coating layer comprises a hydrophobic material, such as polytetrafluoroethylene (e.g., Teflon). The dielectric and coating layers are patterned to create a window 139, exposing the ground electrode.

A drop of conductive liquid 140 is disposed on the coating layer. The drop serves as the microlens. The drop contacts the surface and ground electrode. In an inactive stage, (no voltage applied to the control electrodes), the drop takes on a first shape, as designated by the solid line 141. This shape depends on the size of the drop and the surface energy of the hydrophobic coating layer. When a voltage is applied to the control electrodes, the electric potential from the voltage causes the hydrophobic coating layer to become hydrophilic (e.g., change in wettability), thereby changing the curvature of the drop, as designated by the dotted line 142. The change in curvature changes the focal length. Changing the wettability of the coating layer using an electric field to change the focal length of the fluidic microlens is known as "electrowetting".

However, various problems are associated with electrowetting-controlled fluidic microlenses, limiting their performance. Such problems, for example, include liquid evaporation, contact angle hysteresis, low focal length tunability and high driving voltages. Additionally, the surface energy of the hydrophobic layer creates discrete rapid jumps in curvature change of the microlens instead of a smooth continuous one. This is referred to as the stick-slip behaviour.

Therefore, in view of the foregoing discussion, it is desirable to provide an improved microlens which avoids the problems associated with conventional microlenses.

SUMMARY OF THE INVENTION

The invention generally relates to microlenses. In one embodiment, the invention relates to a variable focus microlens. The microlens, for example, is incorporated into a microlens package, forming a microlens chip. The package includes a top surface having an aperture opening. The aperture opening is coupled to a fluidic channel formed in the package. The fluidic channel is filled with a fluid, which is used to form a microlens at the aperture opening. An actuator, such as a pump, generates fluid pressure in the fluidic channel for focusing the fluidic microlens at the aperture opening.

PREFERRED EMBODIMENTS OF THE INVENTION

The present invention relates generally to fluidic microlenses. In one embodiment, the fluidic microlens is incorporated in a micro-electromechanical system (MEMS), to form a microlens chip. The microlens chip integrates both the lens and actuator. The microlens chip is conducive to micromachining processes. In accordance with one embodiment of the invention, actuation of the fluidic microlens (including formation and focusing) is achieved by changing fluid pressure. Other techniques for actuating the microlens are also useful.

Figure 1:
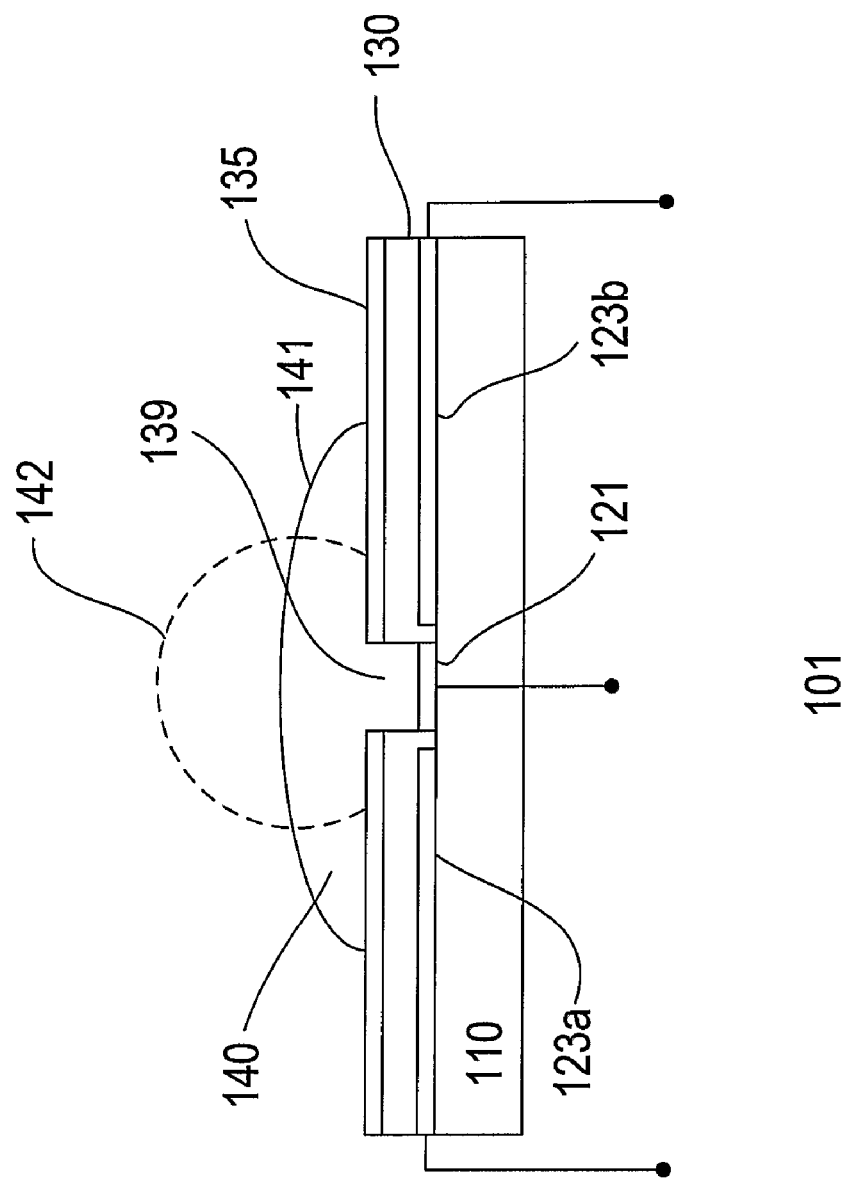
FIG. 1 shows a conventional liquid microlens.
Figure 2:
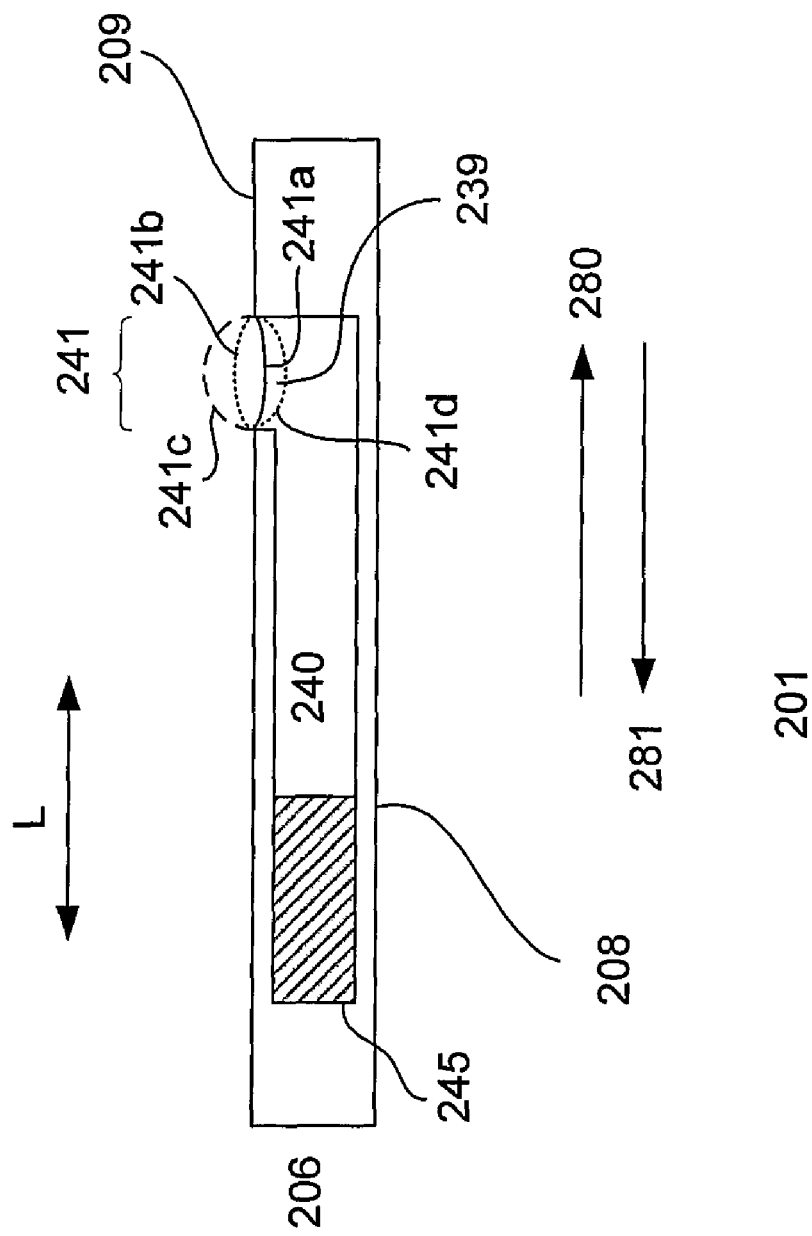
FIG. 2 shows a cross-sectional view of a microlens in accordance with one embodiment of the invention.

FIG. 2 shows a cross-sectional view of a microlens chip 201 in accordance with one embodiment of the invention. As shown, the microlens chip comprises a package 206. Various materials can be used to form the package. For example, the package can be formed from glass, quartz, polymer, ceramic or a combination thereof. Other materials can also be useful. In one embodiment, the package is substantially rigid. Providing a flexible package is also useful.

The package comprises a top surface 209. The top surface includes an aperture opening 239. The aperture opening serves to contain or support a liquid microlens. The top surface, in one embodiment, comprises a hydrophobic material. For example, the hydrophobic material comprises a polymer. Polymers, such as polyimide, polydimethyl-siloxane (PDMS), polymethyl methacrylate (PMMA), polycarbonate, Nylon, or Teflon are also useful. Other types of materials can also be useful.

The lens aperture opening comprises, for example, a circular shape. The diameter of the opening is between about 5 um to 5 mm. Other dimensions may also be useful. Providing an aperture opening having shapes other than a circular shape is also useful. For example, the aperture can comprise an elliptical, square, or rectangular shape. Other geometric shapes could also be useful, depending on the application. The lens aperture, for example, is used to form a spherical or cylindrical shaped-like lens. Providing a lens aperture for forming other types of lenses is also useful.

Within the package is a fluidic channel 240 in communication with the lens aperture. The fluidic channel is filled with a fluid used for forming a liquid microlens 241 at the lens aperture. In one embodiment, the fluid comprises a transparent fluid. The surface tension of the fluid should be sufficient for forming the liquid lens. Preferably, the fluid has a high surface tension. The fluid should preferably comprise a high refractive index about, for example, 1.3 to 1.75. Fluids having other refractive indices are also useful. Preferably, the fluid comprises a polar liquid, such as water or polyhydric alcohols. As shown, the fluidic channel runs along the length of the package, as indicated by arrow L. Other configurations of the fluidic channel (e.g., different directions) are also useful.

In one embodiment, at least the bottom surface 208 of the package in the area corresponding to the lens aperture is transparent to allow light through. Preferably, the bottom surface of the package in the areas not corresponding to the lens aperture is non-transparent to minimize adverse effects of light reflections. The package can be formed from various types of materials, such as glass, quartz, or polymer. The materials used in forming the package can also be transparent, non-transparent materials or a combination thereof. Additionally, the package can be formed from more than one portion, such as top, bottom or multiple portions.

For a package formed from transparent or a combination of transparent and non-transparent materials, one or more opaque layers can be formed over the package, patterned as necessary to leave a transparent area as desired. Where the bottom surface or portion of the package is formed from a non-transparent material, a window can be created by removing the non-transparent material in the area of the bottom surface corresponding to the lens aperture. The window can be covered by a transparent layer to seal the window. Alternatively, a transparent cover can be attached to the bottom surface to seal the window. In yet another embodiment, the window is left uncovered to form a second lens aperture.

A lens actuator 245 is provided in the package. The lens actuator is in communication with the fluidic channel. The lens actuator actuates the liquid microlens, including lens formation and lens focusing. In one embodiment, the lens actuator actuates the liquid microlens by causing or inducing fluid to flow in the fluidic channel. More preferably, the lens actuator actuates the liquid microlens by controlling the amount of liquid flowing into the lens aperture or into the liquid lens at the lens aperture. Depending on the direction of fluid flow (e.g., away from or toward the lens aperture), the lens can be formed or its radius of curvature changed (e.g., increased or decreased).

Various techniques can be employed to cause or induce fluid flow in the fluidic channel or fluid flowing into or out of the lens. For example, a pump can be used to cause fluid flow while a volume change in the fluidic channel (or a fluid reservoir in communication with the fluidic channel) induces fluid flow. Providing an actuator that employs a combination of fluid flow techniques or a plurality of actuators is also useful. Alternatively, pressure outside the fluidic channel can be controlled to cause fluid flow within the channel. For example, pressure inside the fluidic channel can be maintained to form a lens while pressure outside (e.g., outside the lens aperture) can be varied to increase or decrease the amount of fluid flowing into the lens to vary its curvature. Changing the curvature of the lens changes its focal length.

In one embodiment, fluid flow corresponds to a pressure change in the fluidic channel. For example, an increase in pressure correlates with the fluid flowing in a first direction while a decrease in pressure correlates with the fluid flowing in a second direction.

The focal length (f) of a fluidic spherical lens, in one embodiment, is inversely proportional to the internal fluid pressure (P) and directly proportional to the surface tension of the liquid ($\sigma$) in accordance with the following equation:

$$f = \frac{2\sigma}{\Delta n P}$$

where $\Delta n$ is the difference in refractive indices between liquid and air. Being able to vary the focal length using the electrically controlled lens actuator allows the microlens to have a very compact design. In addition, the control of the focusing mechanism using internal fluid pressure allows for continuous, real-time and precise focusing, with wider focal length tunability.

To actuate the microlens, a voltage is applied to the electrodes of the lens actuator. Applying a voltage to the electrodes creates an electrical potential to activate the actuator. Depending on the bias of the electrical potential, the fluid flows in a first direction towards the aperture (arrow 280) or in a second direction away from the aperture (arrow 281).

The fluid flow generated changes the internal fluid pressure in the channel. This affects the curvature of the lens, which in turn affects the focal length of the lens. For example, in the absence of an electrical bias, the lens curvature may take the shape, as indicated by line 241a. The initial shape can be convex or concave, depending on the type of fluid used. As a positive bias is applied to the electrodes to cause the fluid to flow towards the direction of the aperture, internal fluid pressure is increased. This causes a decrease in the lens radius of curvature, as indicated by dotted line 241b. The change in curvature is the result of pressure balance across the lens surface, as defined by:

$$P_{int} = P_{ext} + P_{st},$$

where $P_{int}$ is the internal pressure of the fluid, $P_{st}$ is the pressure due to surface tension and $P_{ext}$ is the external pressure.

Increasing the positive electrical bias further decreases the lens radius of curvature, as indicated by dotted line 241c. Conversely, reducing the electrical bias increases the lens radius of curvature, for example, to the point indicated by lines 241b or 241a, depending on the amount of electrical bias. A concave lens shape, as indicated by dotted line 241d, can also be achieved by further controlling the flow of the fluid away from the lens aperture.

In one embodiment, the lens actuator comprises an electrically controlled lens actuator. The amount and direction of fluid flow can be controlled by applying different magnitude and polarity of voltage or current. Other techniques for actuation control are also useful. For example, actuators that are controlled by thermal (e.g., thermal-pneumatic), magnetic (e.g., magnetohydrodynamic), optical (e.g., photostrictive), electrowetting pump, electromechanical (e.g., piezoelectric) techniques or a combination thereof are also useful.

In one embodiment, the lens actuator comprises an electrokinetic pump to control the direction of fluid flow. An electrokinetic pump controls the direction of flow by the application of electrical potential. In one embodiment, the electrokinetic pump comprises an electroosmotic pump. Other types of actuators that can control fluid flow are also useful. For example, in other embodiments, fluid flow can be controlled by using an electromechanical lens actuator that changes shape depending on the electrical potential applied. Other techniques or combination of techniques for changing direction of fluid flow are also useful.

In one embodiment, a control unit is provided to control the actuator. In one embodiment, the control unit is coupled to the electrodes to regulate the electric field to the actuator by controlling the voltage applied to the electrodes. As a result, the control unit controls the curvature or focal length of the lens. The control unit may be integrated into the microlens chip unit. The control unit comprises, for example, an imaging system which has closed-loop/autofocus or an open-loop control. In closed-loop control or autofocus, an image is provided and the imaging system will calculate the degree to vary the focusing of the lens. The imaging system sends an actuation signal (electrical signal) to the microlens chip unit in order to maintain a focused (sharp) image automatically. In open-loop control, manual control is incorporated to manually focus the lens. Providing a control system which has both open and closed-loop controls is also useful.

In one embodiment, an inlet and an outlet (not shown) are provided to facilitate filling and flushing fluid from the lens package. Providing more than one inlet and outlet is also useful. The inlet and outlet are in communication with the fluidic channel. The locations of the inlet and outlet should be selected to facilitate filling and flushing of the system. Flushing of the system allows new fluid to be filled in the fluidic channel. In one embodiment, the inlet is located toward a first end of the channel while the outlet is located toward a second end of the channel. Preferably, the outlet is located toward the end of the channel near the lens aperture while the inlet is located toward the end where the reservoir is located. Locating the inlet and outlet at different locations of the package is also useful. For non-sealed systems, the lens aperture may serve as the outlet.

A fluid reservoir (not shown) can be provided in communication with the fluidic channel. The fluid reservoir, for example, can be part of or integrated with the fluidic channel. In one embodiment, the fluid reservoir is used to facilitate the flow of fluids directed by the actuator. For example, the reservoir provides air space to enable fluid to flow in first or second directions in the fluidic channel. The lens actuator, in one embodiment, is located between the fluid reservoir and lens aperture. Locating the fluid reservoir at other parts of the fluidic channel is also useful.

In addition or in the alternative, the fluid reservoir can provide additional storage of fluid for filling the fluidic channel. This is particularly useful for non-sealed systems in which the fluid can evaporate from the channel through the lens aperture.

Figure 3:
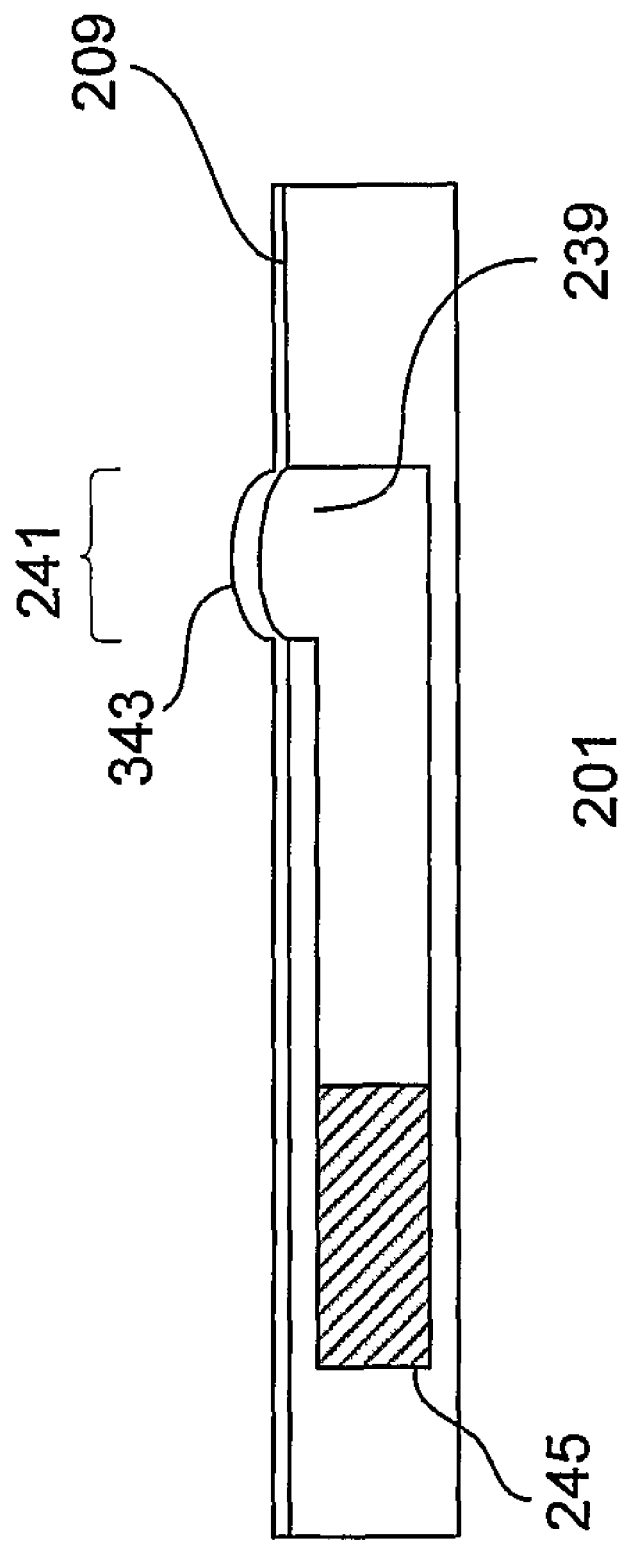
FIGS. 3-9 show cross-sectional views of microlenses in accordance with other embodiments of the invention.
Figure 4:
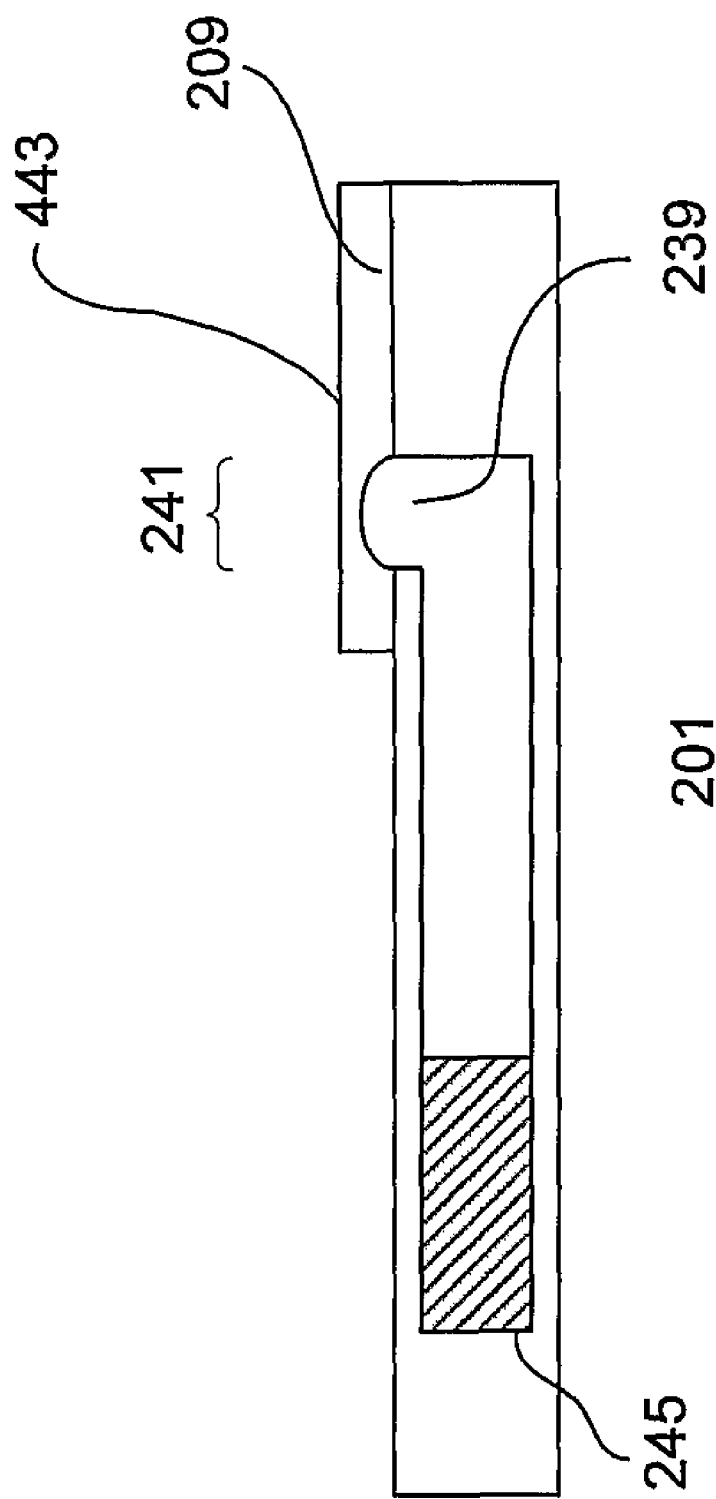

FIGS. 3-4 show cross-sectional views of microlens chips 201 in accordance with other embodiments of the invention. The microlens chips are similar to the microlens chip shown in FIG. 2. Like reference numbers refer to like components of the microlens chip. Referring to FIG. 3, a transparent membrane 343 is disposed on the top surface of the package, covering at least the lens aperture. Providing a membrane which covers the whole surface, a portion of the package including the lens aperture or only the lens aperture 239 is also useful. The membrane comprises, for example, latex, silicon-based elastomers or fluoropolymer elastomers. Other transparent elastic materials are also useful.

The fluid pressure in the fluidic channel, for example, actuates the lens. The transparent membrane seals the lens aperture and deflects due to the change in the fluid pressure. By providing a sealed system, the fluid that forms the microlens can be protected from damage or evaporation of the fluid.

Alternatively, as shown in FIG. 4, a transparent cover 443 is provided on the top surface of the package, enclosing an area covering at least the size of the lens aperture 239. The transparent cover comprises, for example, glass, quartz or transparent polymer, which is attached to the package. Various techniques can be employed to attach the cover to the package. Other transparent materials as well as other techniques for mounting the cover onto the package are also useful.

Figure 5:
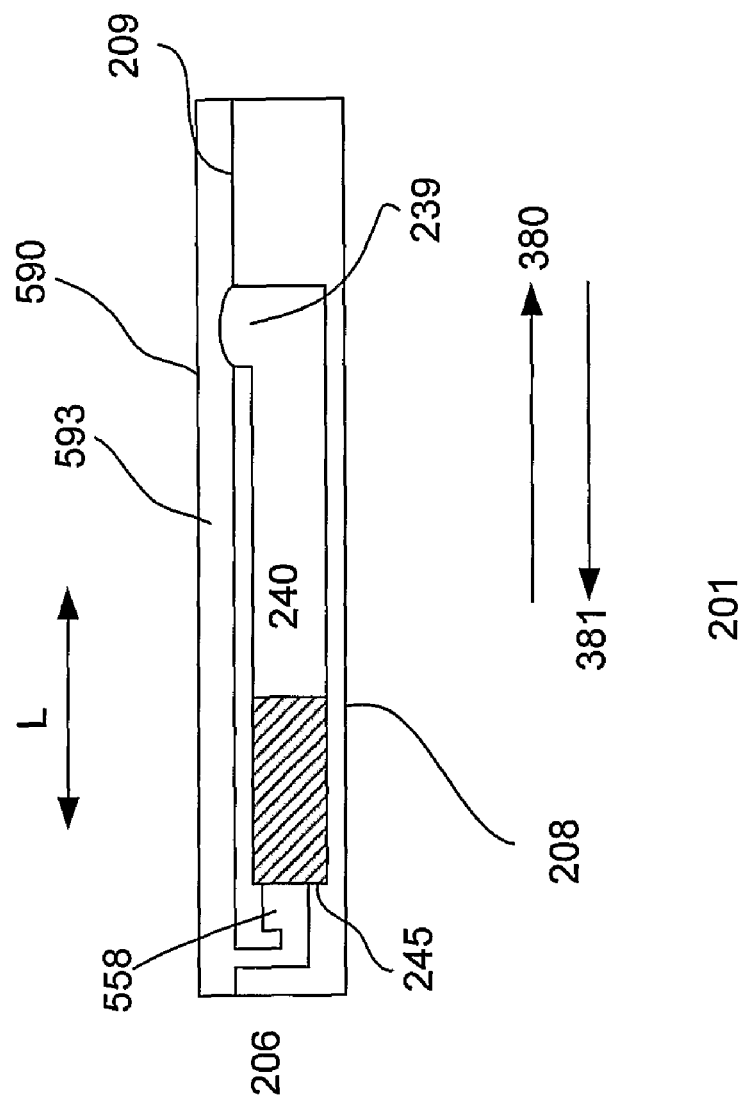
Figure 6:
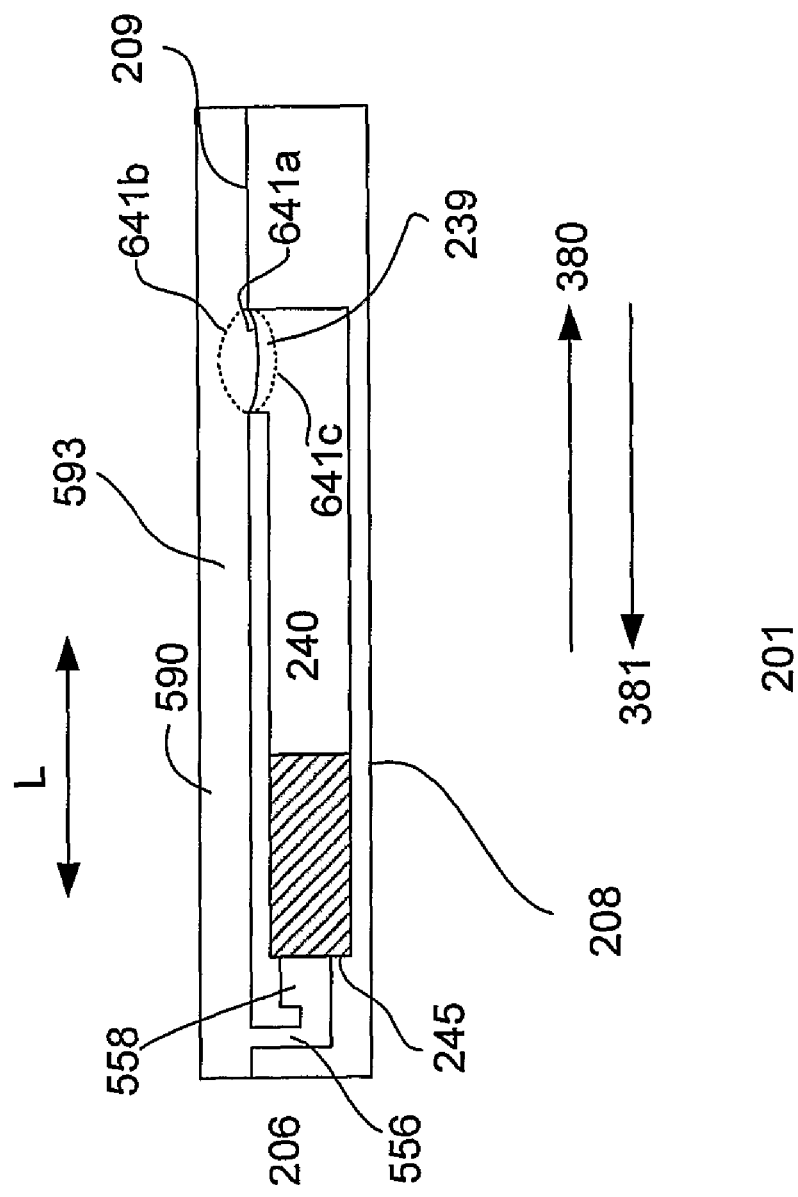

FIGS. 5-6 show cross-sectional views of microlens chips 201 in accordance with other embodiments of the invention. Common reference numbers refer to common components. Referring to FIG. 5, a package 206 of the microlens chip includes a first fluidic channel 240 along a length L of the package. A lens aperture 239 is located toward a first end of the fluidic channel. A lens actuator 245 is disposed in the package and in communication with the fluidic channel. A fluid reservoir 558 is in communication with the fluidic channel. Preferably, the actuator is located between the fluid reservoir and lens aperture. In one embodiment, the bottom surface of the package in an area corresponding to the aperture opening is transparent.

In accordance with one embodiment of the invention, a lens cover 590 encapsulates the top surface 209 of the package, forming a second fluidic channel 593. The lens cover, for example, is formed from a transparent material, such as quartz or glass. Forming the lens cover with a non-transparent material is also useful. For non-transparent lens covers, an opening in an area corresponding to the lens aperture is created and sealed with a transparent material or transparent aperture cover.

The fluidic channels, in one embodiment, create a closed-loop. For example, the closed loop is created by coupling the first and second fluidic channels at both sides of the actuator. In one embodiment, the first and second fluidic channels are coupled by the fluid reservoir. Providing an open-loop system where the first and second fluidic channels are not in communication at both sides of the actuator is also useful.

In one embodiment, the first fluidic channel is filled with a first transparent fluid and the second fluidic channel is filled with a second transparent fluid. The first and second fluids are non-miscible with respect to each other. The first fluid which forms the lens should comprise a high surface tension and a high refractive index. The second fluid preferably comprises substantially the same density as the first fluid. The second fluid should also comprise a different refractive index from the first fluid. Providing fluids having different densities and/or the same refractive index is also useful.

Referring to FIG. 6, a lens 641 is formed by changing the internal pressure of the fluid in the first fluidic channel. For example, the pressure is increased by causing the first fluid to flow toward the lens aperture (arrow 380). This results in the lens having a convex shape, as indicated by dotted line 641b. The change in the shape of the lens causes the second liquid to flow in the opposite direction of the first liquid (arrow 381).

Reducing the pressure by reversing the flow in the first fluid (arrow 381) increases the radius of curvature of the lens, as indicated by, for example, line 641a. This causes the second fluid to flow in the direction toward the aperture (arrow 380). Further reducing the pressure creates, for example, a concave-shaped lens, as indicated by dotted line 641c.

Figure 7:
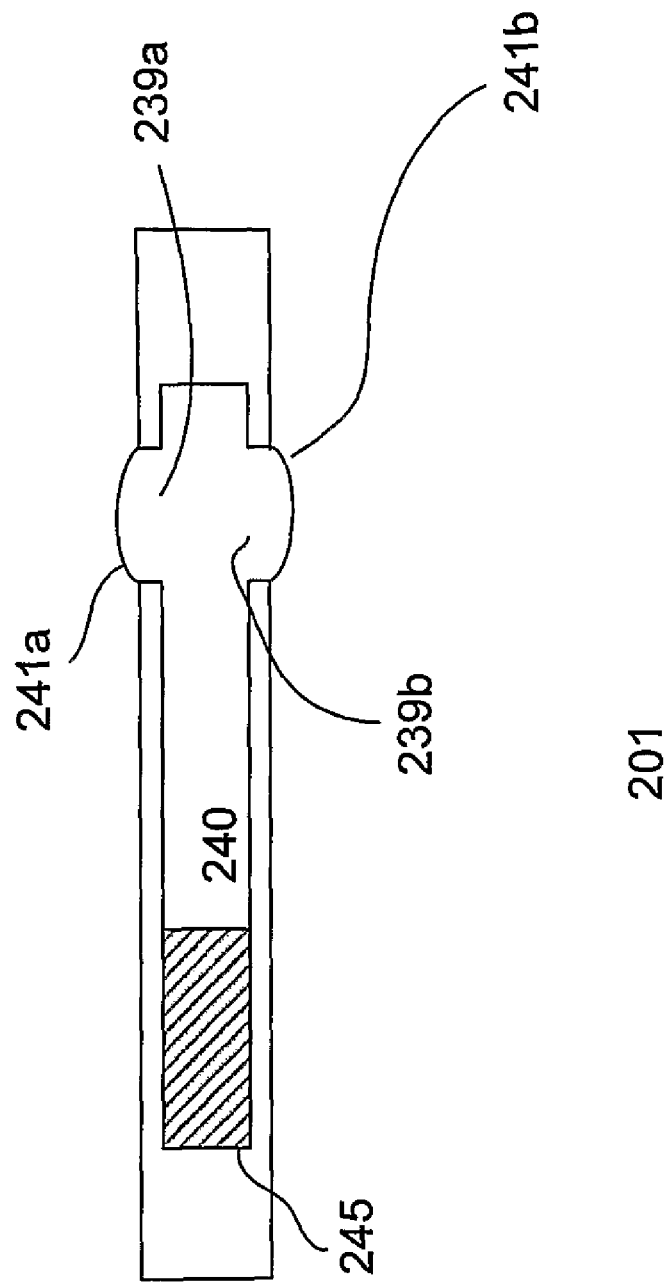

In another embodiment, as shown in FIG. 7, the package 201 includes first and second lens apertures 239a-b in communication with the fluidic channel 240. In one embodiment, the first and second lens apertures are located on opposite sides of the package. For example, the lens apertures are located on top and bottom surfaces of the package. Preferably, the lens aperture are concentric or in alignment with each other. Providing lens apertures which are not concentric or in alignment with each other is also useful. First and second lenses are formed in the lens apertures. Preferably, but not necessarily, the lens apertures comprise the same shape and size. By providing first and second apertures, first and second microlenses can be controlled by the same actuator. For example, bi-convex or bi-concave lenses can be created at opposite surfaces.

Figure 8:
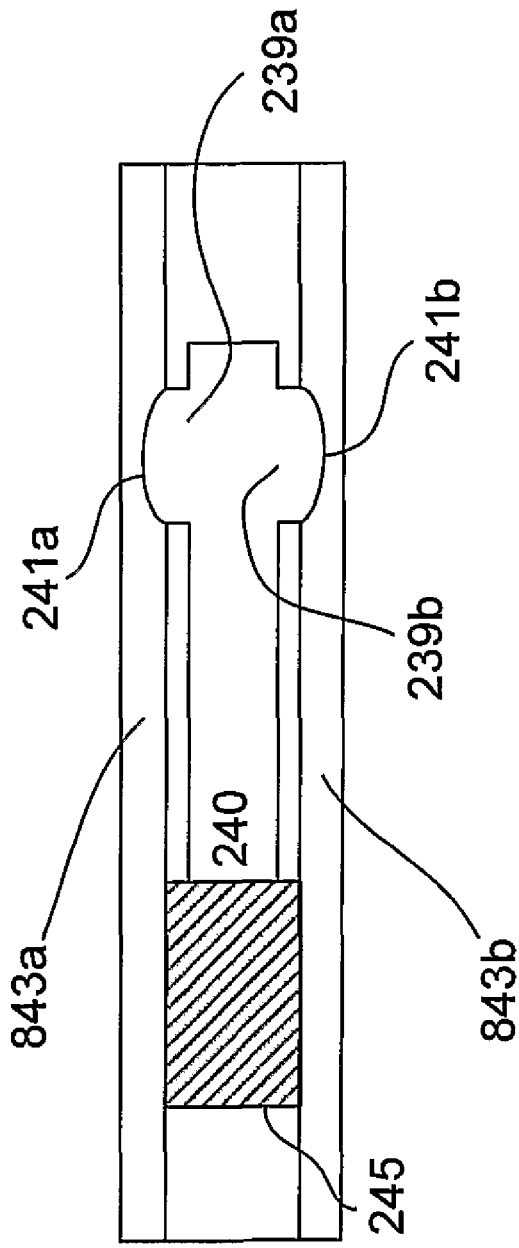

Alternatively, a second fluidic channel 843 is in communication with one of the lens apertures, as shown in FIG. 8. The second fluidic channel serves to contain a second fluid. The first and second fluids work in a push-pull manner (e.g., flowing in opposite directions). Providing a second fluidic channel for each lens aperture (843a-b) is also useful. It is, however, understood that the fluids in the second fluidic channels need not be the same.

In other embodiments, the package can be provided with a plurality of lens apertures, sealed and/or unsealed to create a lens array. The apertures can be controlled by a single actuator or each aperture can be associated with its own actuator. Providing actuators that control some or groups of lenses while the other controls a single lens or other group of lenses is also useful. Various combinations of actuators and lens configurations are also useful. Additionally, lens apertures can be provided on one or both surfaces. The lens apertures can be un-sealed or sealed using techniques already described.

Figure 9:
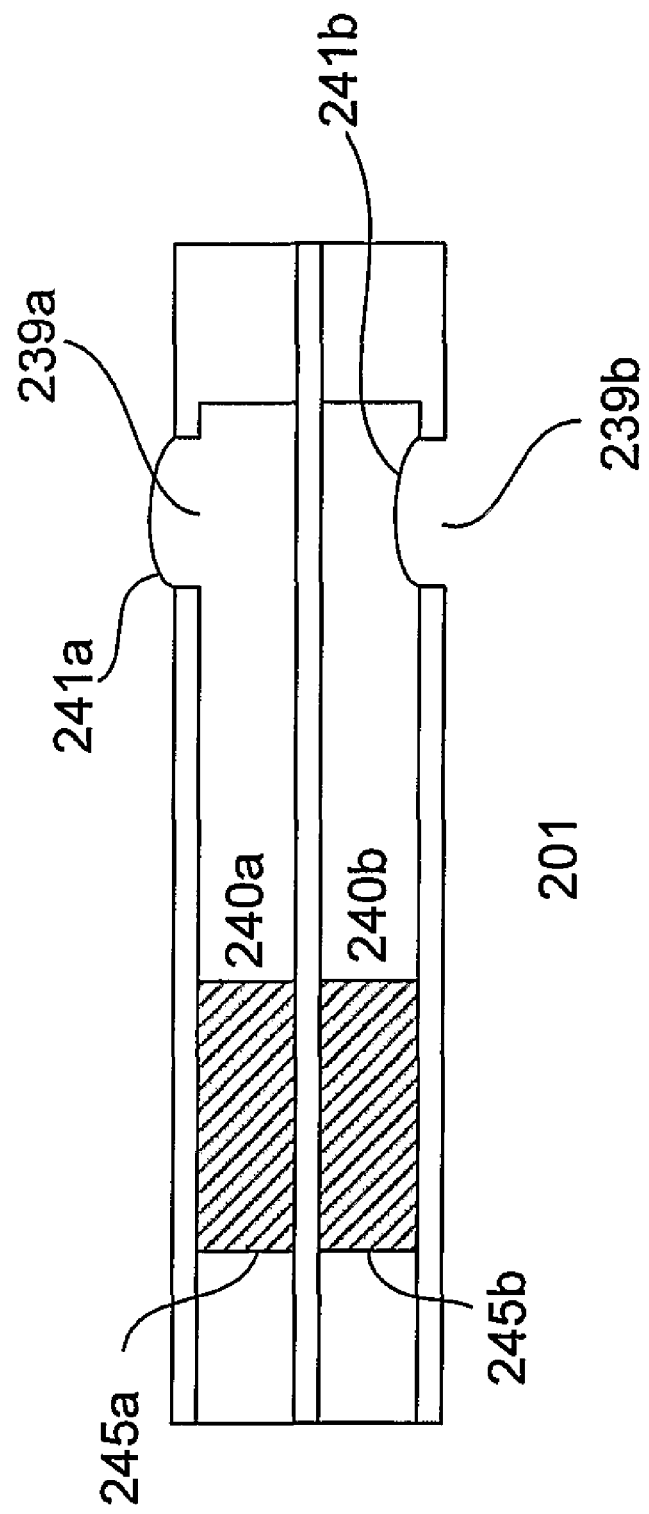

For example, as shown in FIG. 9, the package includes first and second isolated fluidic channels 240a-b. Each fluidic channel is associated with its own actuator (245a or 245b) and lens aperture (239a or 239b). In one embodiment, the lens apertures are located on opposite surfaces and are concentric or in alignment with each other. Providing lens apertures which are not concentric is also useful. The lens apertures, although preferable, need not be the same size or shape. Associating an actuator with each lens aperture, various combination of lens can be formed. For example, one can be concave while the other can be convex.

Figure 10:
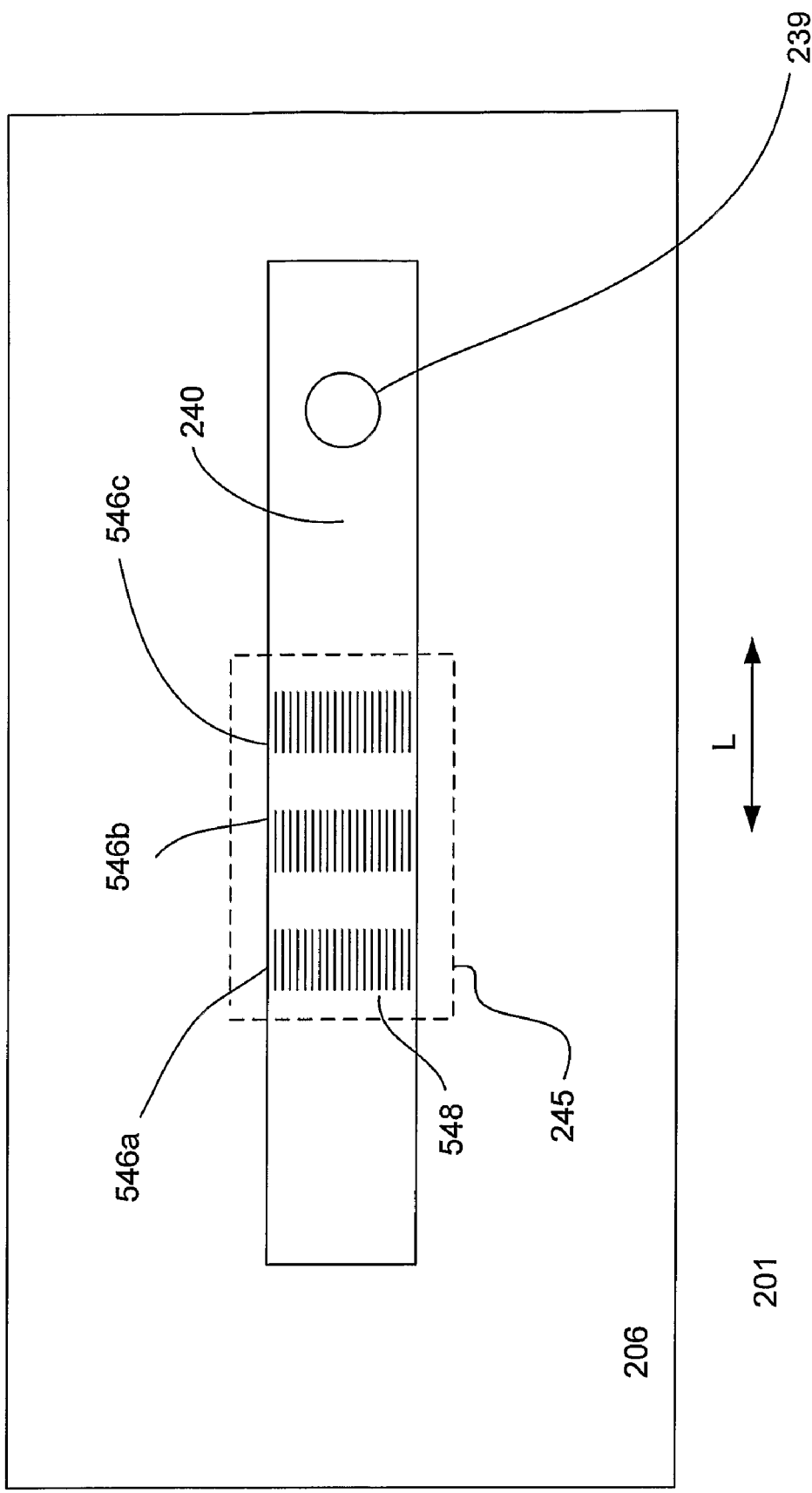
FIGS. 10-13 show top views of actuators in accordance with various embodiments of the invention.

FIGS. 10-13 show top views of microlens chips 201 in accordance with different embodiments of the invention. Common reference numbers refer to common components. Referring to FIG. 10, a package 206 of the microlens chip includes a fluidic channel 240 along a length L of the package. A lens aperture 239 is located toward a first end of the fluidic channel. An electrically controlled lens actuator 245 is disposed in communication with the fluidic channel.

In one embodiment, the lens actuator comprises at least one electrokinetic pump. As shown, the lens actuator comprises first, second and third electrokinetic pumps 546a-c arranged in series along the fluidic channel. Other pump arrangements, such as parallel or a combination of series and parallel are also useful. First and second electrodes (not shown) are provided for each pump to generate an electrical field. Providing first and second electrodes which control more than one pump is also useful. For example, the first and second electrodes can be located at respective ends of the pump arrangement for controlling the three pumps. By applying an electric field, the pump causes fluid to move in the fluidic channel. Depending on the direction of movement, the fluid pressure in the channel can be increased or decreased.

The electrokinetic pump, for example, comprises an electroosmotic pump. Other types of electrokinetic pumps are also useful. Electroosmotic pumps are described in, for example, Goodson et al., "Electroosmotic Microchannel Cooling System" (US Patent Application Publication No. US 2003/0062149), which is herein incorporated by reference for all purposes. For electroosmotic pump applications, the fluid in the fluidic channel comprises a dielectric or polar fluid.

Since the electroosmotic pump uses an electric field to drive charges in the vicinity of the liquid-solid interface, the fluidic channel preferably has a very high surface area to volume ratio to increase the flow rate and pressure. In one embodiment, the electroosmotic pump comprises a plurality of micro-channels 548 in the fluidic channel to increase the surface area in contact with the liquid and hence enhance the electroosmotic pumping efficiency.

In one embodiment, the micro-channels are provided by a plurality of microstructures. The pumping efficiency may be increased by increasing the number of microstructures. Groups of microstructures can also be provided at different locations in the fluidic channel to increase the surface area. Each group, for example, forms a pump. Providing groups that form a pump is also useful. Other types of configurations or geometries of micro-channels are also useful. Additionally, sintered microporous media, porous silica, nanostructured media, micro-channel plate structures, porous ceramic/polymer materials or other materials with high surface area to volume ratio may be used to fabricate the fluidic channel so as to further increase the pumping efficiency.

When a polar liquid is brought in contact with the dielectric solid, a surface potential develops at the interface. Electroosmosis occurs when an electric field is applied across this charged liquid-solid interface. Liquids that can be used, for example, include water, aqueous buffer solutions, electrolyte solutions of organic solvents and organic solvent-water mixtures. Other types of liquids can also be used.

Figure 11:
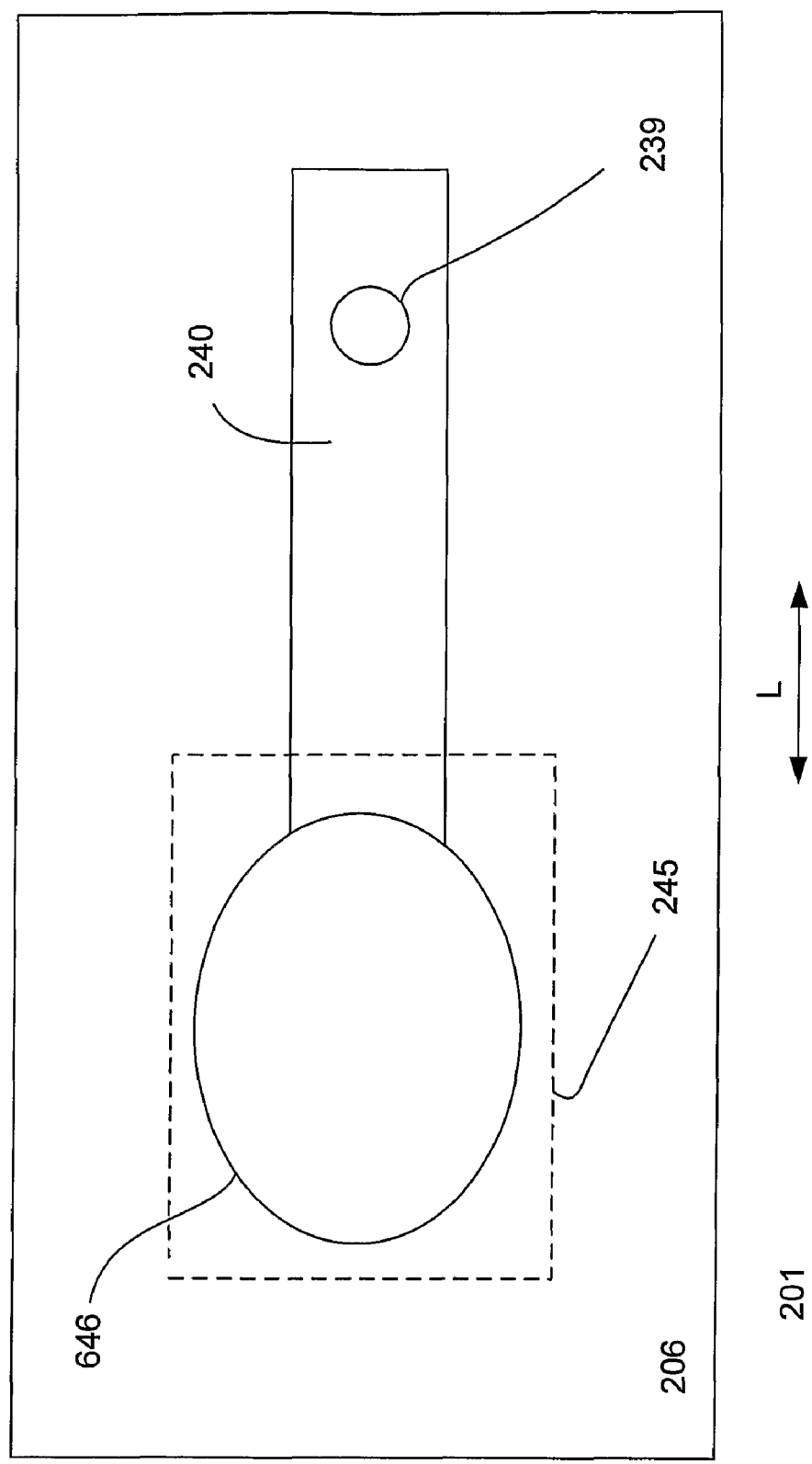

Referring to FIG. 11, the electrically controlled lens actuator comprises an electromechanical lens actuator 646 (e.g., a piezoelectric disc or voice coil). Although only one electromechanical lens actuator is shown, it is understood that providing more than one is also useful. Piezoelectric discs are described in, for example, Nguyen et al., "A fully polymeric micropump with piezoelectric actuator", Sensors and Actuators B-Chemical 97 (1): 139-145, Jan. 1, 2004; Kim J H et al., "A disposable polydimethylsiloxane-based diffuser micropump actuated by piezoelectric-disc", Microelectronic Engineering 71 (2): 119-124, February 2004; and Nguyen et al., "Miniature valveless pumps based on printed circuit board technique", Sensors and Actuators A 88 (2001) 104-111, all of which are hereby incorporated by reference for all purposes. Applying an electric field causes the electromechanical actuator to deflect, changing the pressure in the fluidic channel. This in turn controls the volume displacement of the fluid in the channel to actuate the microlens at the lens aperture 239.

Figure 12:
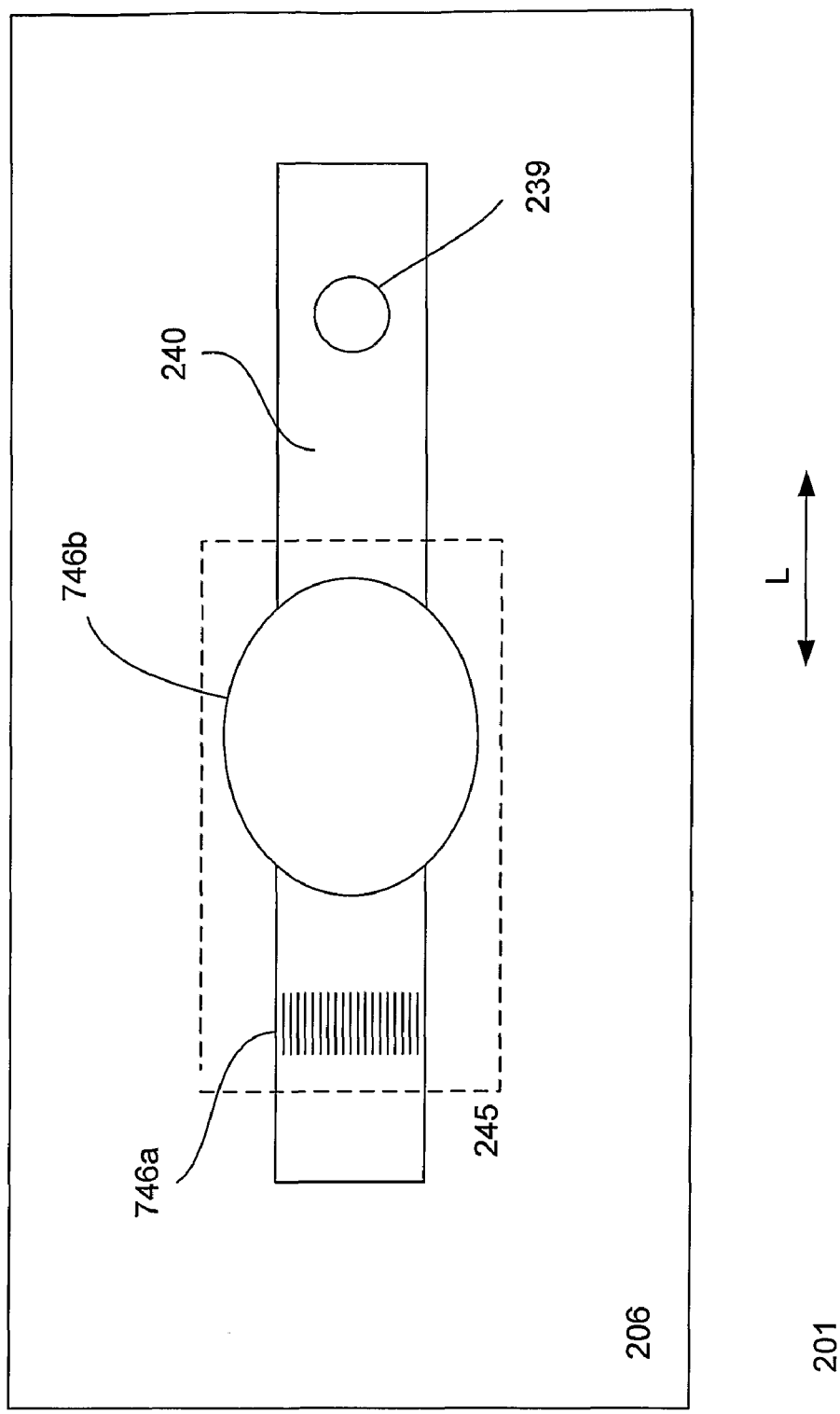
Figure 13:
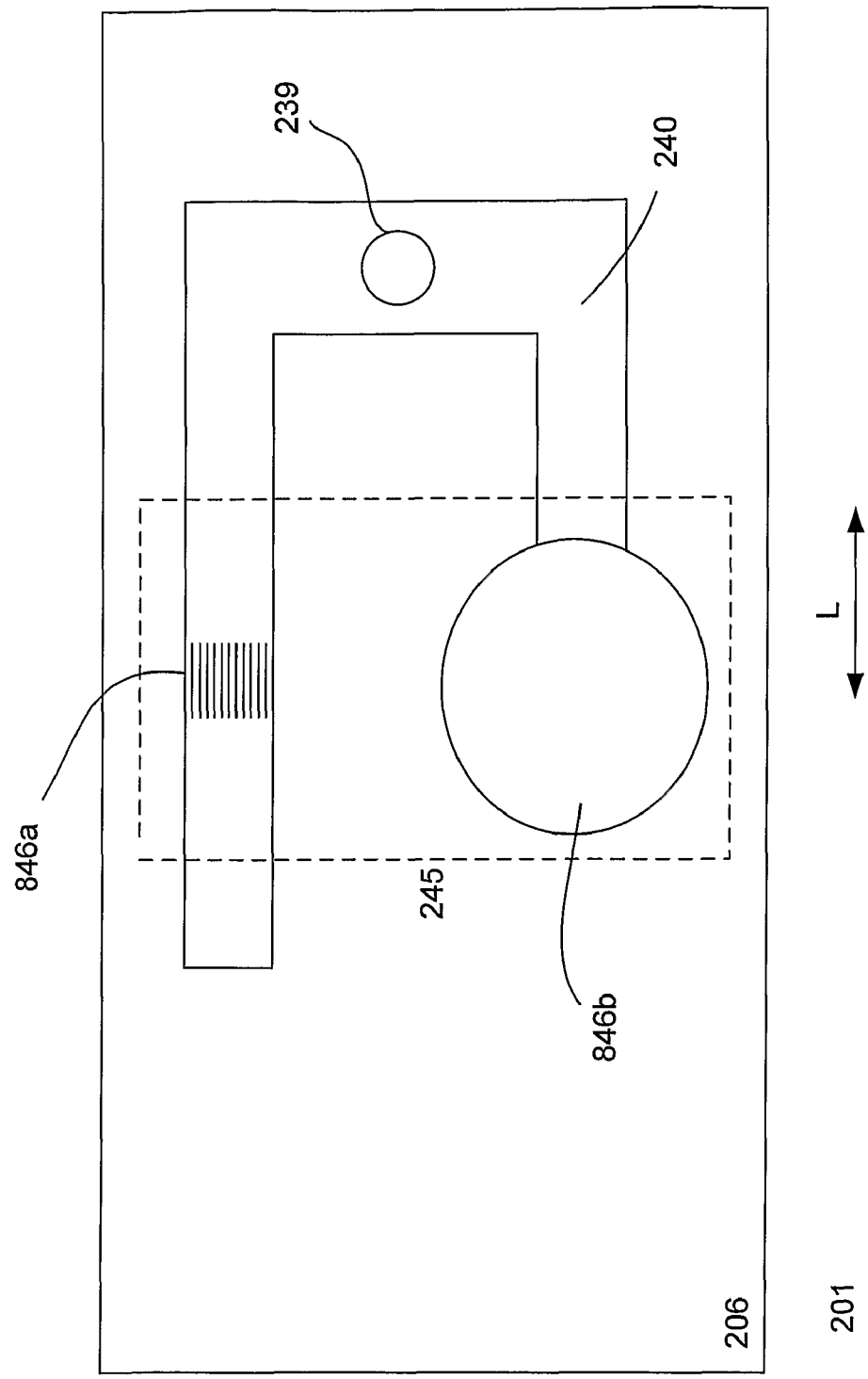

Referring to FIG. 12, the lens actuator comprises different types of electrically controlled actuators. As shown the lens actuator comprises an electrokinetic pump 746a and electromechanical actuator 746b arranged in series. Providing one or more electrokinetic pumps in series with one or more electromechanical actuators is also useful. It is further understood that the same type of actuators need not be grouped together. Alternatively, as shown in FIG. 13, the lens actuator 245 comprises at least one electrokinetic pump 846a and at least one electromechanical actuator 846b arranged in parallel with respect to the lens aperture 239. Other arrangements of lens actuators are also useful.

The microlens chip can be provided with a fluid reservoir (not shown). Additionally, at least one inlet (not shown) is provided for filling the fluid system of the microlens chip. An outlet (not shown) may also be further provided for facilitating flushing the system.

In one embodiment, the package 206 comprises bottom and top portions. The top portion comprises the aperture opening 239 while the bottom portion comprises the fluidic channel 240. In one embodiment, the top portion is formed from polymer or other materials that facilitate formation of the microlens. The bottom portion comprises a transparent material, such as quartz, glass or a polymeric material. Forming the bottom section from a non-transparent material is also useful.

Figure 14A:
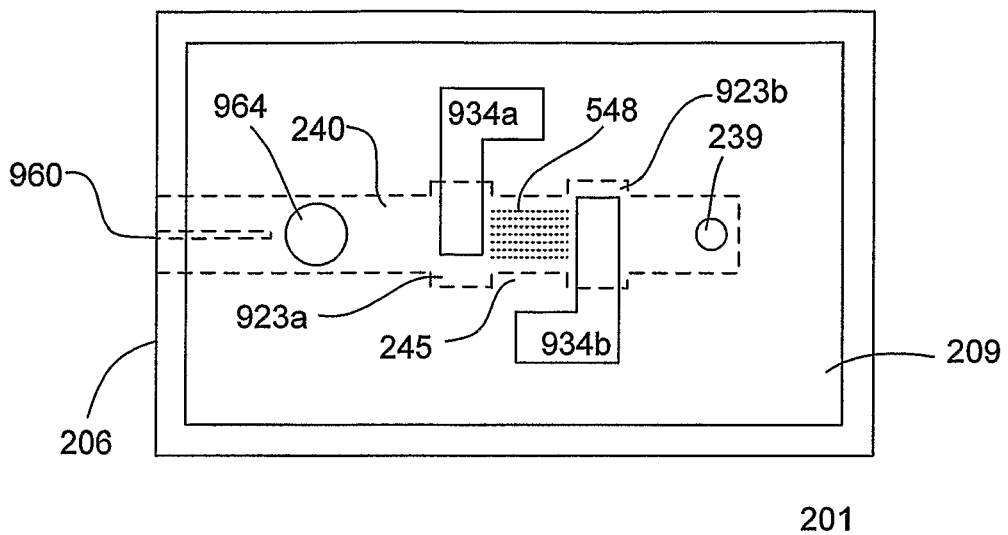
FIGS. 14a-b show top and cross-sectional views of a microlens in accordance with one embodiment of the invention.
Figure 14B:
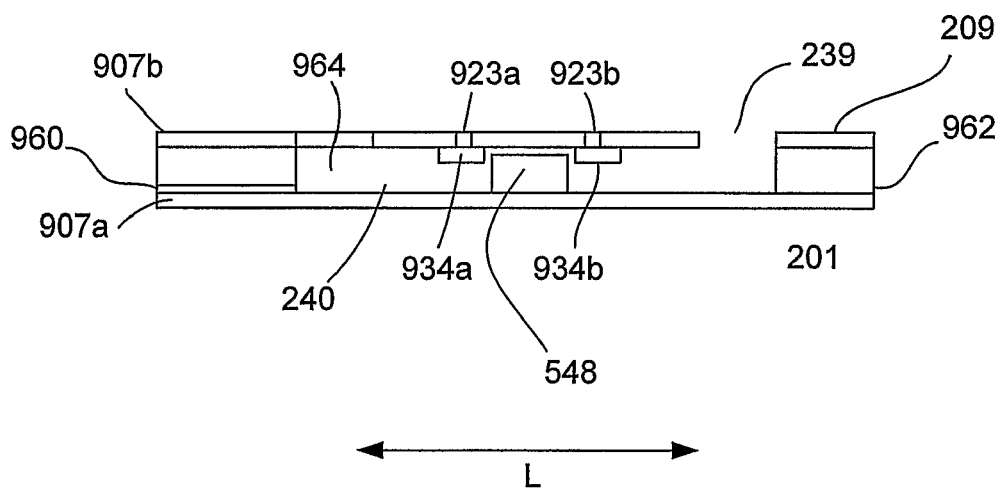

FIGS. 14a-b show top and corresponding cross-sectional views of a microlens chip 201 in accordance with one embodiment of the invention. As shown, the microlens comprises a package 206. In accordance with one embodiment of the invention, the package comprises bottom and top portions 907a-b. The top portion, which forms a top surface 209 of the package, includes an aperture opening 239 in which a microlens is formed.

In one embodiment, the top portion is formed from a hydrophobic material. The top portion comprises, for example, a polymer. Various types of polymers, such as polyimide, polydimethyl-siloxane (PDMS), polymethyl methacrylate (PMMA), polycarbonate, Nylon, and Teflon are also useful. Other types of materials such as glass or quartz are also useful. A thin membrane can be provided over the top surface covering the lens aperture, as shown in FIG. 3. Providing a lens cover over the lens aperture, as shown in FIG. 4, is also useful.

The bottom portion includes a fluidic channel 240 in communication with the lens aperture. In one embodiment, the bottom portion comprises a non-conductive material. Preferably, the non-conductive material is transparent. For example, the bottom portion can be formed from quartz. Other types of non-conductive transparent material, such as glass, polydimethyl-siloxane (PDMS), polymethyl methacrylate (PMMA), polycarbonate, Nylon and Teflon are also useful. Non-transparent materials, such as polyimide or ceramics are also useful to form the bottom portion.

The fluidic channel, in one embodiment, runs along the length L of the package. Providing a fluidic channel having other configurations is also useful. A fluid reservoir 964 can be located on the bottom portion in communication with the fluidic channel. Locating the fluid reservoir in the top portion or a combination of top and bottom portions is also useful. Preferably, the fluid reservoir is located at or near the opposite end of the fluidic channel as the lens aperture. Other locations for the fluid reservoir are also useful. The fluid reservoir provides fluid in the channel for forming the microlens.

In one embodiment, an inlet 960 in communication with the fluidic channel is provided to facilitate filling the lens package. In one embodiment, the inlet is located toward a first end of the channel. Providing the inlet at other parts of the package is also useful. An outlet (not shown) may also be provided, for example, to facilitate flushing of the system.

The fluidic channel comprises an electrically controlled lens actuator 245 for actuating the microlens. Other types of lens actuators are also useful. In one embodiment, the lens actuator is located between the fluid reservoir and aperture opening. In one embodiment, the lens actuator comprises an electroosmosis pump having a plurality of microstructures 548 formed in the fluidic channel, creating a plurality of micro-channels.

First and second electrodes 934a-b are, for example, formed on an inner surface of the top portion of the package. Alternatively, the first and second electrodes may be formed on an inner surface of the bottom portion of the package. The electrodes are in communication with the fluidic channel. The electrodes are separated by the microstructures of the lens actuator. To provide access to the electrodes, the top portion is patterned to create electrode access windows 923a-b. In one embodiment, the electrodes comprise a conductive material, such as palladium. Other types of metals (e.g., platinum, gold or alloys thereof), conductive polymers, conductive ceramics, conductive oxides (e.g., indium tin oxide), ionic liquid electrolytes or polymer electrolytes are also useful. Focusing of the microlens can be facilitated by the use of a control unit (not shown), which controls the actuator by regulating the voltage applied to the electrodes.

Fabrication of the microlens can be achieved using microfabrication techniques. For example, the various components, such as lens aperture, electrode windows, and inlet opening, of the top portion of the package are formed by, for example, photolithography and micromachining in conjunction with standard techniques. Other techniques for forming the aperture and openings are also useful. For example, the aperture and openings can be formed by laser machining or other machining techniques. In an alternative embodiment, the top portion is formed by molding techniques. The electrodes can be formed by depositing an electrode layer on the inner surface of the top portion and patterned, as desired.

The various components of the bottom portion (e.g., fluid reservoir, fluidic channel and pump) can be formed using lithography and etch techniques. For example, a mask is used to serve as an etch mask for deep reactive ion etching (DRIE) to form the components. The bottom portion may also be formed using standard molding or machining techniques. After the top and bottom portions are formed, they are attached to complete the package. In one embodiment, the portions are attached using oxygen plasma activation. Other attachment processes, such as fusion bonding or polymer bonding, are also useful.

Figure 15A:
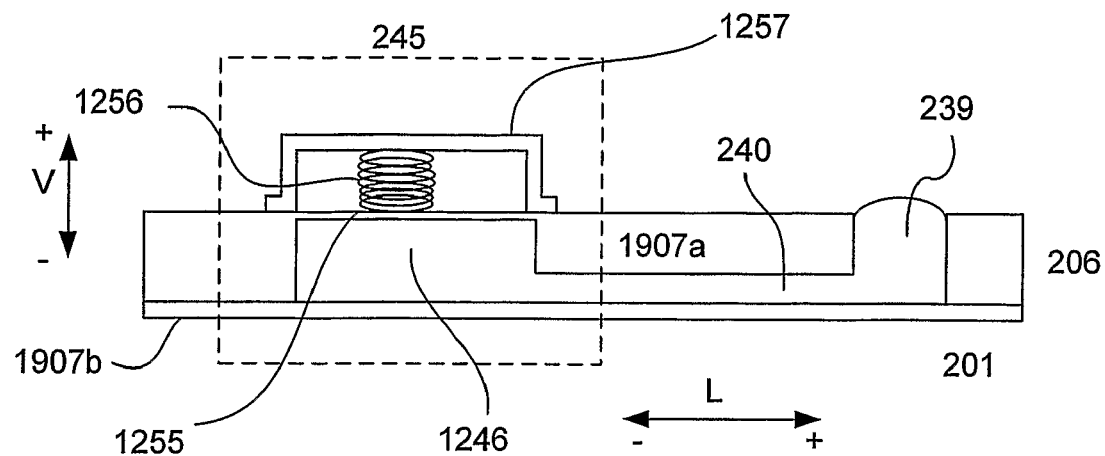
FIGS. 15a-b show cross-sectional views of a microlens in accordance with various embodiments.
Figure 15B:
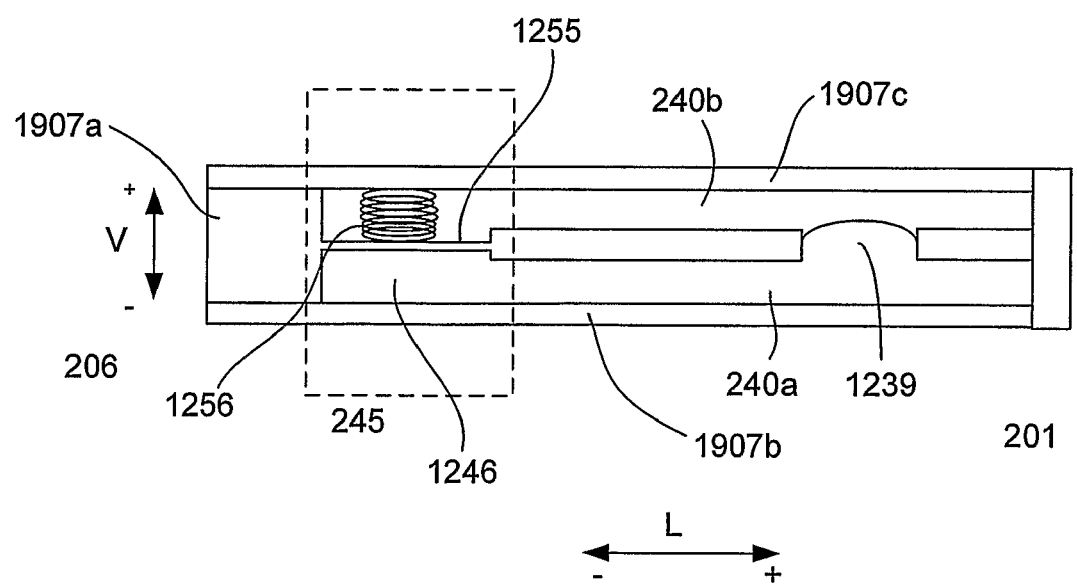

FIGS. 15a-b show cross-sectional views of microlens chips 201 in accordance with other embodiments of the invention. Referring to FIG. 15a, a microlens chip package 206 includes an electromechanical lens actuator 245. The electromechanical lens actuator changes the pressure in the fluidic channel 240 by causing a volume displacement of the fluid therein. The change in pressure causes a microlens to be actuated at a lens aperture 239.

In one embodiment, a fluid reservoir 1246 is provided in the fluidic channel. Preferably, the fluid reservoir is relatively larger than the dimensions of the fluidic channel. The fluid reservoir is, for example, located at one end of the fluidic channel. Other locations for the fluid reservoir are also useful. In one embodiment, the reservoir comprises an oval or circular shape. Other geometric shapes are also useful.

In one embodiment, the lens actuator comprises a diaphragm 1255 in communication with the fluidic channel. The diaphragm covers a surface of the fluidic channel. The diaphragm is located, for example, on a top surface of the package. Locating the diaphragm at other parts of the package is also useful. The diaphragm can be formed as part of a portion 1907a of the package (e.g., lower or upper portion) by micromachining techniques, such as laser etching or molding. Such portion, for example, includes the other parts of the package, such as the fluidic channel. Alternatively, the diaphragm may be attached on the surface of the lens package or actuator housing 1257. Another portion 1907b can be provided to seal the fluidic channel. The lens aperture can be located on either portion.

The diaphragm can be deflected in the V direction to cause a volume displacement of the fluid. For example, by deflecting the diaphragm, a pressure is applied to the liquid in the fluidic channel. This in turn causes a volume displacement of the fluid in the channel, thus actuating the lens. For example, a volume displacement of the fluid in the positive L direction can be effected by deflecting the diaphragm in the negative V direction. Conversely, a volume displacement of the fluid in the negative L direction can be achieved by deflecting the diaphragm in the positive V direction.

The diaphragm can be formed from various types of materials. For example, the diaphragm can be formed from polymers such as polyethylene, polypropylene or polyimide. Other types of materials, such as Maylar, ceramics or pliable metals, are also useful. The thickness of the diaphragm should enable it to be deflected without breaking.

In one embodiment, an electromechanical stress inducer 1256 is provided in communication with the diaphragm. An electric field applied to the stress inducer to cause it to expand or contract in the V direction, controlling the stress induced on the diaphragm. The direction and magnitude (e.g., amount of expansion or contraction) depends on the magnitude and polarity of the voltage or current applied. This effectively causes a volume displacement of the fluid in the fluidic channel to actuate the microlens.

In one embodiment, the stress inducer comprises a voice coil, such as a linear voice coil. The coil comprises a metal (e.g., copper, platinum, gold or aluminum) wire. Other types of wires are also useful. Other types of stress inducers, such as piezoelectric stress inducers, are also useful.

In one embodiment, a housing 1257 is provided to encapsulate the electromechanical stress inducer. The housing is, for example, attached to the surface of the package. In one embodiment, the housing provides structural support for the electromechanical stress inducer, enabling it to exert stress on the diaphragm. Various types of material, such as polymeric or metallic materials, can be used to form the housing.

In one embodiment, the diaphragm is formed without inherent stress. This results in the diaphragm having a relatively flat profile. As stress is exerted by the stress inducer, the diaphragm deflects in the negative direction. As the electric field is reduced or removed, the diaphragm reverts to its natural profile.

In another embodiment, the diaphragm is formed with inherent stress, creating a bow shape. Preferably, the stress causes the diaphragm to bow upwards, forming a convex shape. Various techniques can be used to induce inherent stress in the diaphragm, such as providing a stress inducing layer or varying the processing parameters used in forming the diaphragm. In the absence of an electric field (e.g., neutral position), the diaphragm naturally bows upward towards the stress inducer. Applying an electric field to the stress inducer causes it to expand, deflecting the diaphragm in the negative V direction. Providing inherent stress in the diaphragm facilitates forming a concave or convex lens. Alternatively, the stress inducer is capable of causing the diaphragm to deflect in the positive and negative V direction to form either a concave or convex lens. In yet another embodiment, the convex lens is formed when the diaphragm is in its natural or normal position.

Inlets and outlets may be provided to facilitate filling and flushing of the fluid system. To protect the microlens, a thin membrane or lens cover can be provided, as described in FIGS. 4 and 5. Providing additional actuators, either of the same or different types, are also useful.

Referring to FIG. 15b, the portion of the microlens package 206 comprises a first and a second fluidic channels 240a-b. In one embodiment, the first fluidic channel includes a fluid reservoir 1246 covered by a diaphragm 1255. The first and second fluidic channels are separated by the lens reservoir. In one embodiment, the fluidic channels and diaphragm are formed as part of a first portion (e.g., middle portion) of the package. Other techniques for providing the diaphragm and/or fluidic channels are also useful.

In one embodiment, a stress inducer 1256 is provided in communication with the diaphragm. The stress inducer exerts stress on the diaphragm to cause it to deflect, thereby changing the volume in the fluidic channels. In one embodiment, the stress inducer 1256 is located in communication with the diaphragm and in the second fluidic channel. Locating the stress inducer in other parts of the package, such as in communication with the diaphragm and in the first fluidic channel, is also useful. The stress inducer, for example, comprises a voice coil. Other types of electromechanical stress inducers are also useful.

A lens aperture 1239 is in communication with the first and second fluidic channels in another portion of the package. The lens aperture is preferably formed in the portion of the substrate which includes the channels and diaphragm. Forming the lens aperture in other portions of the package is also useful. The first fluidic channel comprises a first liquid and the second fluidic channel comprises a second liquid. The first liquid, for example, serves to form the microlens. Forming the microlens with the second liquid or by either the first or second liquid is also useful.

The fluids in the channels operate in a push-pull arrangement. For example, as the fluid in the first channel is displaced in the positive L direction, the fluid in the second channel is displaced in the negative L direction and vice-versa. In one embodiment, the lens curvature radius is increased as the first fluid flows in the positive L direction. Conversely, the lens curvature radius is decreased by causing the first fluid to flow in the negative L direction. Depending on the amount of flow in the negative L direction, a concave lens can be formed. Other configurations are also useful. Top and bottom portions, for example are attached to the middle portion to seal the channel to form the package.

In another embodiment, the package includes a fluidic channel and lens aperture. An external actuator is coupled to the package, causing fluid flow in the fluidic channel to actuate the microlens at the aperture. In yet another embodiment, first and second lens concentric apertures are provided in the package. Non-concentric apertures are also useful (on different or same surfaces). The lens apertures are controlled by the external actuator. Providing each lens aperture with its own fluidic channel and external actuator is also useful. Providing a plurality of apertures which are located on one or both surfaces of the package and which are controlled by one or more actuators are also useful.

While the invention has been particularly shown and described with reference to various embodiments, it will be recognized by those skilled in the art that modifications and changes may be made to the present invention without departing from the spirit and scope thereof. The scope of the invention should therefore be determined not with reference to the above description but with reference to the appended claims along with their full scope of equivalents.

What is claimed is:
1. A variable focus microlens comprising:
a microlens package, the package includes
an opening on a surface of the microlens package, the opening serves as a lens aperture,
a fluidic channel disposed in the microlens package, the fluidic channel is in communication with the lens aperture, and
an actuator integrated into the microlens package in communication with the fluidic channel, when the channel is filled with a lens fluid, the actuator can cause the lens fluid to bulge at the lens aperture to form a liquid lens in the lens aperture and variably focusing the liquid lens by controlling flow of the lens fluid in the fluidic channel to change a curvature of the liquid lens, the liquid lens defining an air-liquid interface.

2. The variable focus microlens of claim 1 wherein the liquid lens can be reformed depending on the direction of flow of the lens fluid.

3. The variable focus microlens of claim 1 wherein the lens aperture comprises a circular or rectangular shape.

4. The variable focus microlens of claim 3 wherein the liquid lens can be reformed depending on the direction of flow of the lens fluid.

5. A variable focus microlens comprising
a microlens package, the package includes
an opening on a surface of the microlens package, the opening serves as a lens aperture,
a fluidic channel disposed in the microlens package, the fluidic channel is in communication with the lens aperture, a rigid protective lens cover covering the lens aperture, the rigid protective lens cover providing an air space between the lens aperture and the rigid protective lens cover, and an actuator integrated into the microlens package in communication with the fluidic channel, when the channel is filled with a lens fluid, the actuator can cause the lens fluid to bulge at the lens aperture to form a liquid lens in the lens aperture and variably focusing the liquid lens by controlling flow of the lens fluid in the fluidic channel to change a curvature of the liquid lens, the liquid lens defining an air-liquid interface.

6. The variable focus microlens of claim 5 wherein the microlens package further comprises:

a second opening on an opposing surface of the opening of the microlens package, the second opening serving as a second lens aperture; and when the channel is filled with a lens fluid, the actuator causes the lens fluid to bulge at the lens aperture and the second lens aperture to form a biconvex or a biconcave liquid lens.

7. The variable focus microlens of claim 6 further comprising a second rigid protective lens cover covering the second lens aperture, the second rigid protective lens cover providing an air space between the second lens aperture and the second rigid protective lens cover.

8. The variable focus microlens of claim 1 wherein the actuator comprises an electrically controlled actuator.

9. The variable focus microlens of claim 8 wherein the electrically controlled actuator comprises an electrokinetic pump or an electromechanical actuator.

10. The variable focus microlens of claim 9, wherein the electrically controlled actuator comprises an electromechanical actuator, wherein the electromechanical actuator comprises:

a fluid reservoir in communication with the fluidic channel;
a diaphragm covering the fluid reservoir; and
an electrically controlled stress inducer in communication with the diaphragm, the electrically controlled stress inducer causes the diaphragm to deflect to control flow of the lens fluid in the fluidic channel.

11. The variable focus microlens of claim 10 wherein the electrically controlled stress inducer comprises a voice coil, a micro-speaker, or a piezoelectric stress inducer.

12. The variable focus microlens of claim 1 further comprising a second actuator.

13. The variable focus microlens of claim 12 wherein the first and second actuators comprise electrically control actuators.

14. A variable focus microlens comprising:
a microlens package;
a cavity on the microlens package, the cavity forming a lens aperture;
a fluidic channel disposed in the microlens package, the fluidic channel is in communication with the lens aperture;
an actuator integrated into the microlens package in communication with the fluidic channel, when the channel is filled with a lens fluid, the actuator can cause the lens fluid to bulge at the lens aperture to form a liquid lens and variably focusing the liquid lens by controlling flow of the lens fluid in the fluidic channel, the liquid lens defining an air-liquid interface; and
a secondary fluidic channel in communication with the lens aperture, when the fluidic channel is filled with the lens fluid and the secondary fluidic channel is filled with a secondary lens fluid which is different from the lens fluid, the liquid lens forms a liquid-liquid interface with the secondary lens fluid.

15. The variable focus microlens of claim 14 wherein the secondary fluidic channel and the fluidic channel form a closed loop.

16. The variable focus microlens of claim 14 wherein:
the microlens package further comprises a second opening on an opposing surface of the opening of the microlens package, the second opening serving as a second lens aperture, when the channel is filled with the lens fluid, the actuator can cause the lens fluid to bulge at the lens aperture and the second lens aperture to form a biconvex or a biconcave liquid lens; and secondary fluidic channels in communication with the lens aperture and the second lens aperture, when the fluidic channel is filled with the lens fluid and the secondary fluidic channels are filled with secondary lens fluids which are different from the lens fluid, the liquid lens forms liquid-liquid interfaces with the secondary fluids.

17. The variable focus microlens of claim 16 wherein the secondary fluidic channels and the fluidic channel form a closed loop.

18. The variable focus microlens of claim 1 further comprising:

a second opening on an opposing surface of the microlens package disposed in parallel with the opening, the second opening forming a second lens aperture;

a second fluidic channel disposed in the microlens package, the second fluidic channel is in communication with the second lens aperture; and a second actuator integrated into the microlens package in communication with the second fluidic channel, when the second fluidic channel is filled with a liquid that forms a second liquid lens, the second actuator can cause the liquid to bulge at the second lens aperture to form the second liquid lens in the second lens aperture and variably focusing the second liquid lens by controlling flow of the liquid in the second fluidic channel.

19. The variable focus microlens of claim 1 wherein:
the package comprises top and bottom opposing surfaces;
the surface on which the lens aperture is disposed is the top surface; and
at least a portion of the bottom surface of the package in the area corresponding to the lens aperture is transparent to allow light there through.

20. A variable focus microlens comprising:
a microlens package;
an opening on a surface of the microlens package, the opening serves as a lens aperture;
a fluidic channel disposed in the microlens package, the fluidic channel is in communication with the lens aperture; and
an electrically controlled actuator integrated into the microlens package in communication with the fluidic channel, when the channel is filled with a liquid, the actuator can cause the liquid to bulge at the lens aperture to form a liquid lens in the lens aperture and variably focusing the liquid lens by controlling flow of the liquid in the fluidic channel to change a curvature of the liquid lens, the liquid lens defining an air-liquid interface.

21. A variable focus microlens comprising:
a microlens package;
an opening on a surface of the microlens package, the opening serves as a lens aperture;

a fluidic channel disposed in the microlens package, the fluidic channel is in communication with the lens aperture; and an electromechanical actuator integrated into the microlens package in communication with the fluidic channel, when the channel is filled with a liquid, the actuator can cause the liquid to bulge at the lens aperture to form a liquid lens in the lens aperture and variably focusing the liquid lens by controlling flow of the liquid in the fluidic channel to change a curvature of the liquid lens, the liquid lens defining an air-liquid interface.

* * * * *